Feb. 21, 1956  S. O. BJORNBERG  2,735,189
APPARATUS FOR TESTING SPLINES
Filed July 27, 1951  3 Sheets-Sheet 2
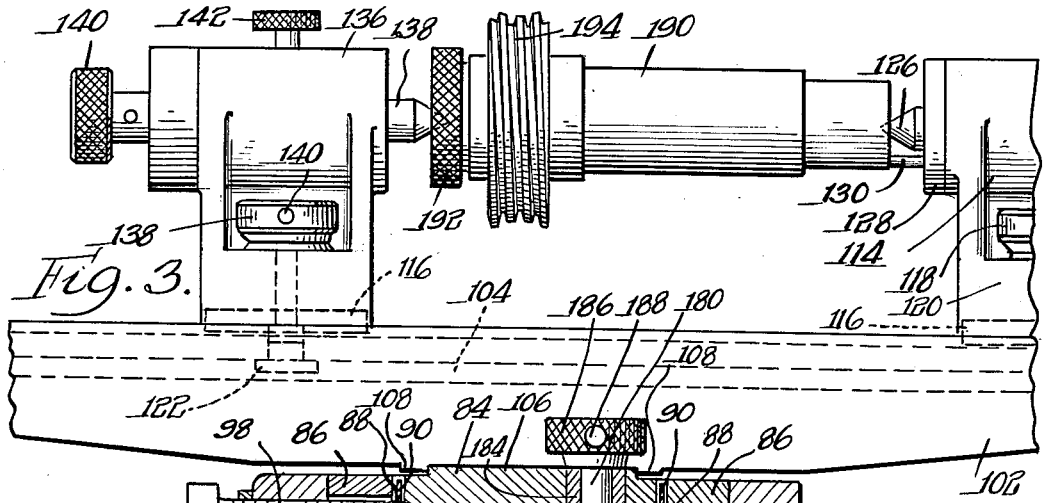
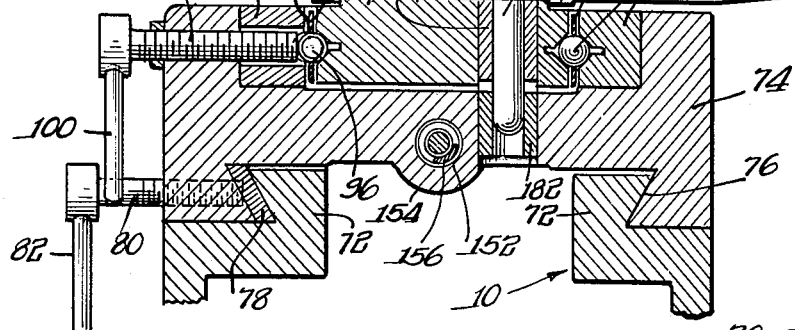
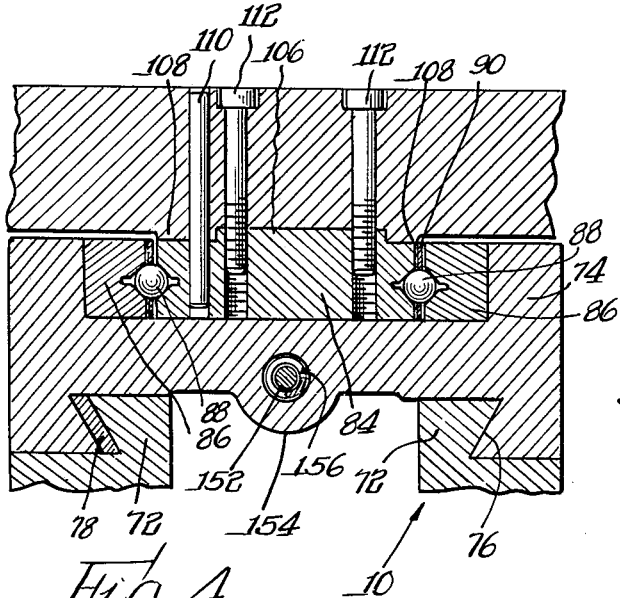
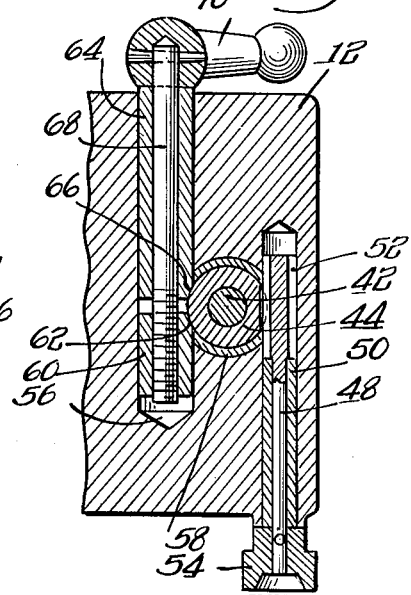
INVENTOR.
Swan O. Bjornberg
BY
Moore, Olson & Trexler
Attys.

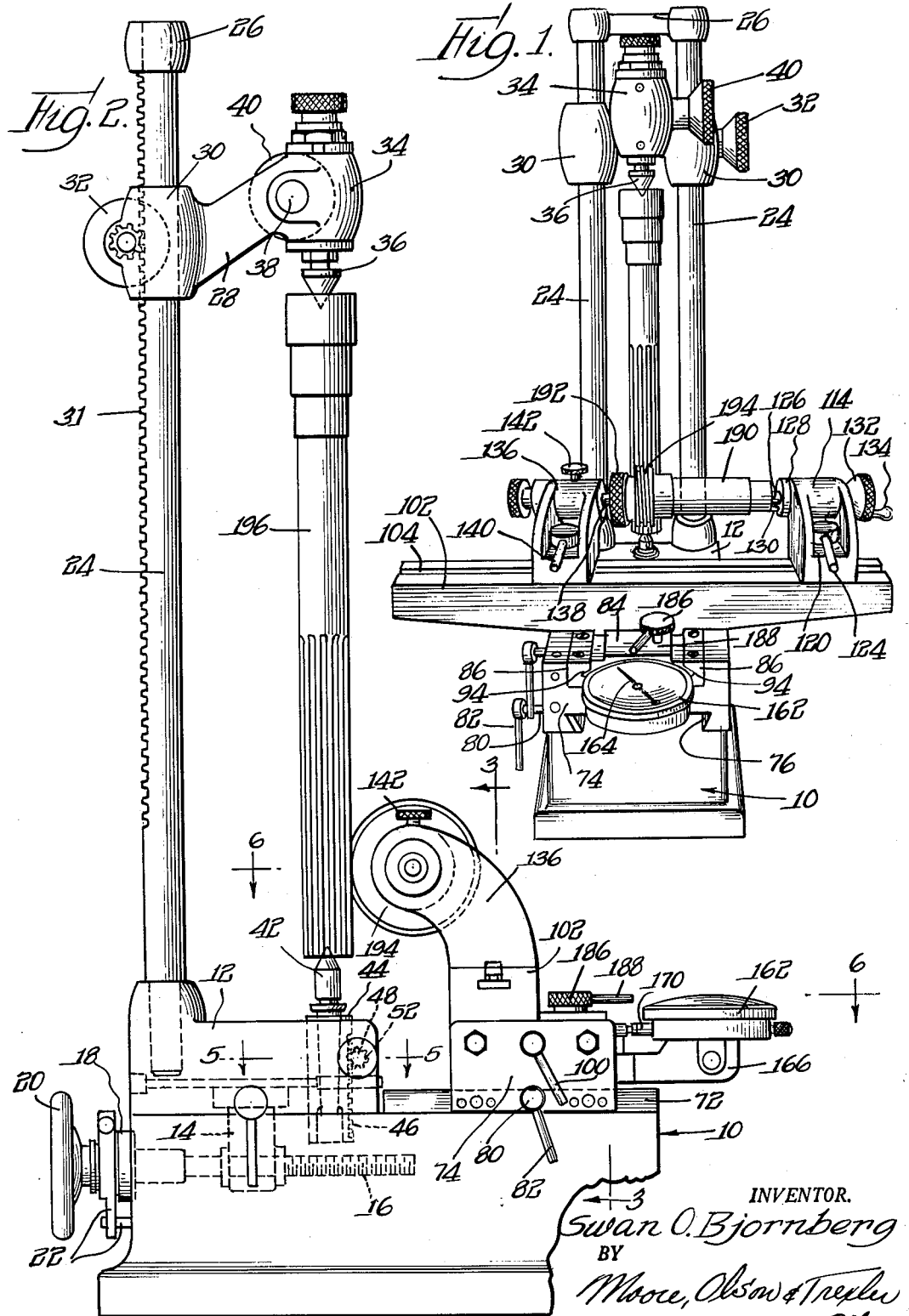

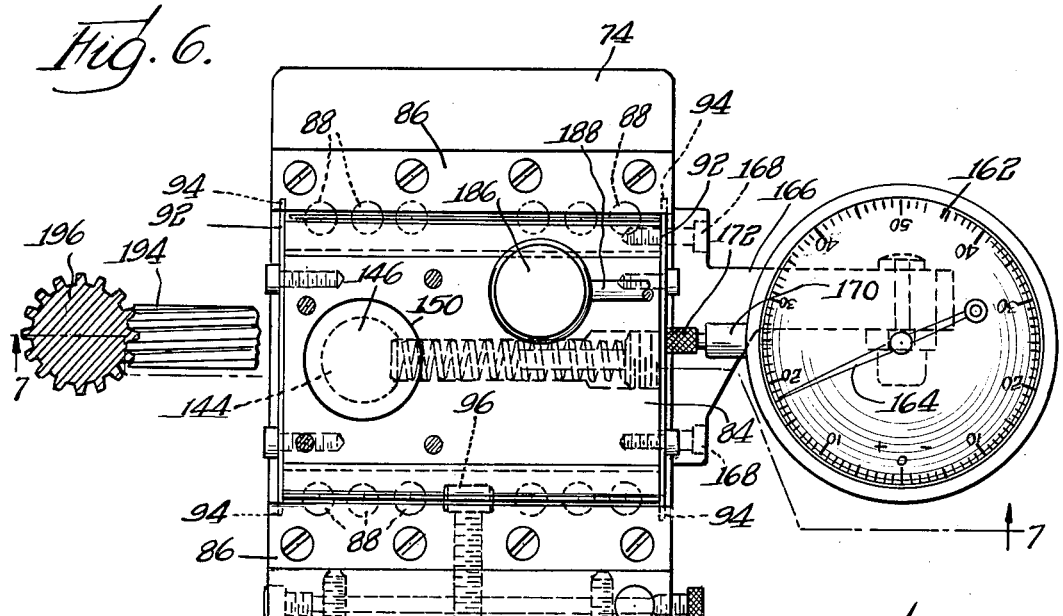

United States Patent Office 2,735,189
Patented Feb. 21, 1956

2,735,189

APPARATUS FOR TESTING SPLINES

Swan O. Bjornberg, Chicago, Ill., assignor to Illinois Tool Works, Chicago, Ill., a corporation of Illinois Application July 27, 1951, Serial No. 238,831

3 Claims. (Cl. 33—179.5)

This invention is concerned with a machine or apparatus for checking or testing involute splines and the like.

Splines, gears and the like must interfit or mesh with other parts. For proper interfitting or meshing the various dimensions of the splines, gears or the like must be held within predetermined tolerances. In particular, it is desirable to check eccentricity, tooth profile and tooth spacing.

Heretofore such checking has been effected rapidly with gears by rolling a master gear and the gear to be checked together. One of the two gears is rotatably mounted on a fixed base while the other is rotatably mounted on a slide. When the meshed gears are rotated together, any error in eccentricity, tooth profile or tooth spacing causes the slide to reciprocate in its mount. The movement of the slide is measured by an indicating instrument, conveniently in the form of a dial, and the indicator readings are predetermined to distinguish between satisfactory and unsatisfactory gears.

Until this time it has been impossible to inspect or check involute splines by rolling the splines in contact with a master gear as a master gear constructed to mesh with an involute spline using involute spline tooth dimensions would be incapable of driving or transmitting motion to the involute spline due to a contact ratio of less than one. More specifically, the teeth are not of the proper proportions to have one tooth pick up the motion smoothly when the preceding tooth transmitting the motion drops out of action. This causes a discontinuity or jump in the rotary motion and renders a rolling check impossible.

An object of this invention is to provide a new or improved apparatus for inspecting or checking involute splines or the like.

A further object of this invention is to provide an apparatus for making a rolling check of an involute spline or the like with no discontinuities or jumps in motion.

Another object of this invention is to provide an apparatus for checking involute splines and the like wherein the checking member constantly is in driving engagement with the spline or the like to be checked.

A more specific object of this invention is to provide an apparatus for checking involute splines and the like wherein such apparatus has an enveloping worm in continuous and checking engagement with the spline or the like to be checked.

Other and further objects and advantages of the present invention will be apparent from the ensuing description when taken in connection with the accompanying drawings wherein:

Fig. 1 is a perspective view of a checking apparatus embodying the principles of my invention;

Fig. 2 is a side view of the apparatus;

Fig. 3 is a fragmentary vertical sectional view along the line 3—3 of Fig. 2;

Fig. 4 is a fragmentary vertical sectional view along the line 4—4 of Fig. 7;

Fig. 5 is a fragmentary horizontal sectional view along the line 5—5 of Fig. 2;

Fig. 6 is a top view of a portion of the apparatus and showing the spline in section as taken along the line 6—6 of Fig. 2;

Fig. 7 is a vertical sectional view taken along the line 7—7 of Fig. 6; and

Fig. 8 is a fragmentary horizontal view showing engagement of the spline and enveloping worm.

A checking machine or apparatus embodying the principles of my invention is shown generally in Figs. 1 and 2 and includes a base or pedestal 10 having a support 12 slidably mounted thereon by means of a dovetail joint (not shown). The support 12 includes a depending structure 14 threaded for cooperation with an adjusting rod or bolt 16 for longitudinal adjustment of the support 12. The adjusting rod 16 is journaled in a bearing 18 fixed in the pedestal or base 10 and the rod further is provided with a hand wheel 20. Cooperating stop members 22 are provided on the adjusting rod and pedestal for limiting or restricting movement of the rod.

The support 12 is provided with a pair of parallel, upstanding rods or posts 24 spaced apart at their upper ends by a separator or spacer 26. A bracket 28 includes a pair of cylindrically apertured members 30 slidably fitting on the posts 24. The members 30 are provided with a transverse rod having pinion gears formed thereon for engagement with racks 31 on the back sides of the posts 24. A knob or hand wheel 32 is provided for rotating the rod to adjust the height of the bracket 28.

A headstock 34 is carried at the outer extremity of the bracket 28 and is provided with a vertically shiftable headstock center 36 having a conical tip. A rack is formed on one side of the headstock center or on a chuck or the like mounting such center and a pinion formed on a cross shaft 38 engages such rack for vertical adjustment of the headstock center. A knurled knob or hand wheel 40 is provided for rotating the cross shaft 38. A second spline mounting member, hereinafter called the tailstock center 42, is carried by the support 12 in axial alignment with the headstock 36. The tailstock center 42 is mounted in a cylindrical member 44 having a rack 46 formed on one side thereof (see also Figs. 5 and 7). A transverse rod or shaft 48 is mounted by means of a sleeve bearing 50 in the support 12 and is formed with a spur gear 52 on its inner end in engagement with the rack 46. A knob 54 is pinned to the outer end of the rod or shaft 48 for rotation thereof to adjust the tailstock center 42 vertically. A transverse bore 56 enters the support 12 from the side thereof opposite the rod or shaft 48 and intersects the cylinder 44 carrying the tailstock center 42. The bearing 58 carrying the cylinder 44 is cut away at the point of intersection by the bore 56 as it is on the opposite side for cooperation with the gear 52. A nut 60 is trapped in the inner end of the bore 56 by the tailstock cylinder 44 and is provided with a relieved, concave edge 62 for engaging the cylinder. A sleeve 64 fits in the bore 56 outwardly of the cylinder 44 and is provided with a relieved, concave edge 66 for engaging the cylinder. A bolt 68 extends through the sleeve 64 and readily engages the nut 60. An adjusting arm 70 is pinned to the outer end of the rod 68 for threading the rod into the nut 60 to clamp the cylinder 44 between the nut 60 and sleeve 64 to lock the tailstock center 42 in position as set by the knob 54 and gear 52.

The top of the pedestal 10 is provided with a pair of longitudinal flanges 72 (Figs. 2, 3 and 4) forming a dovetail slide for mounting a bed 74, the latter having a dovetail guideway 76 cooperating with the dovetail slide 72. A shim, plate, or wedge 78 is interposed between one of the flanges 72 and the cooperating edge of the dovetail guide 76 and an adjusting bolt 80 having a handle or lever 82 is threaded through the bed 74 and fits in a recess in the shim or plate 78 for clamping the same against the flange or slide 72 to lock the bed 74 to the pedestal 10. A testing carriage 84 is shiftably mounted in the bed 74 by means of elongated bearing blocks 86 and a pair of sets of ball bearings 88. Confronting faces of the bearing blocks 86 and of the testing carriage 84 are provided with aligned V-shaped grooves for receiving the balls 88. The balls are held in proper spaced apart relation by separator strips 90 and the balls and strips are held in the groove by plates 92 (Fig. 7) screwed or otherwise fixed on opposite ends of the carriage 84 and having V-shaped points 94 (Fig. 1) extending into the V-shaped grooves of the blocks 86. A cylindrical slug 96 is positioned by one of the separator strips 90 and a clamp screw 98 having an operating handle or lever 100 and threaded through the bed 74 abuts said slug for clamping the bed and testing carriage together.

The testing carriage 84 is provided with a transverse saddle 102 having an elongated T-shaped slot 104. The top of the testing carriage 84 is provided with a longitudinal ridge 106 and depending ridges 108 on the saddle fit on opposite sides of the ridge 106 positively to prevent twisting of the saddle relative to the carriage 84 and also to space the saddle above the bed 75. The saddle and carriage are located relative to one another by a dowel pin 110 and are secured together by screws 112 fitting in countersunk bores in the saddle and threaded into tapped bores in the carriage 84.

A headstock 114 is slidably mounted on the saddle 102 and is provided with a depending flange or key 116 fitting in the top portion of the slot 104 as shown in Fig. 7. Bolt 118 passes through a flat base portion 120 in the headstock 114 and is threaded into a substantially T-shaped nut 122 in the slot 104. The bolt head is provided with a transverse lever or handle 124 for rotating the bolt to tighten the nut and thereby to lock the headstock 114 in adjusted position. The headstock 114 is provided with a headstock center having a conical tip 126 and a radial flange 128 adjacent the tip. A driving pin or dog 130 extends from the flange 128 for driving a mandrel as will appear hereinafter. A knurled hand wheel 132 is provided for rotating the headstock center and a crank handle 134 is provided on the hand wheel to facilitate rotation thereof.

A tailstock 136 is slidably mounted on the saddle in alignment with the headstock 114. The tailstock is slidably mounted in the same manner as the headstock by means of a key 116 and is locked in position by a bolt 138 having a transverse arm 140 and threaded into a T-shaped nut 122 in the slot or channel 104. The tailstock 136 is provided with a tailstock center 138 having a conical tip and axially adjustable in the tailstock 136 by means of a knurled knob 140, the tailstock center preferably being threaded through the tailstock for such adjustment. A set screw having a knurled head 142 is threaded into the tailstock 136 and abuts the center 138 for locking the center in place.

The testing carriage 84 is provided with a depending post or abutment 144 fitting snugly within an aperture in the carriage. An enlarged, flat head 146 fits in a countersink and is clamped in place by the saddle 102 as shown in Figs. 6 and 7, the saddle being removed in Fig. 6 for clarity of illustration. The lower portion of the post or abutment 144 fits within an opening or chamber 148 in the bed 74 and is provided with a radial recess 150. The bed 74 is provided with a longitudinal bore 152 aligned with the radial recess 150 and the bed is provided with a depending rib 154 to provide adequate space for the bore. A compression coil spring 156 is housed within the bore 152 and is held against the post 144 in the recess 140 by a plug 158 threaded into the enlarged outer end of the bore 152. An axial pin 160 on the plug 158 serves to centralize the spring 156 and the spring urges the testing carriage 84 toward the support 12 as will be apparent.

A testing gage or indicating instrument 162 of known construction and having a dial pointer 164 is mounted on a bracket 166 secured to the bed 74 by means such as screws 168. The indicating instrument 162 is provided with a plunger 170. The plunger is provided with a knurled adjustment 172 on its outer end and abutting the plate 92 on the end of the testing carriage 84. The knurled adjustment 172 is adjustable axially of the plunger by rotative movement.

A pin 180 fits in bearing members or cylindrical sleeves 182 and 184 respectively to lock the testing carriage 84 in retracted position against the action of the spring 156. The pin is provided with a knurled head 186 and a transverse handle 188 for facilitating withdrawal of the pin.

A mandrel 190 is mounted between the headstock and tailstock centers 126 and 138 respectively and is driven by the dog 130 on the headstock. The mandrel is provided with a knurled ring 192 for clamping an enveloping worm 194 on the mandrel. It will be appreciated that the enveloping worm is replaceable and is keyed to the mandrel for rotation therewith. The enveloping worm 194 is adapted for cooperative engagement with a spline shaft 196 mounted between the headstock and tailstock centers 36 and 42. As best seen in Fig. 8, the longitudinal concavity of the enveloping worm 194 causes the teeth 198 of the worm to engage a plurality of the teeth 200 of the spline shaft concurrently. Therefore, upon rotation of the enveloping worm by turning of the hand wheels 132 and crank handle 134 the enveloping worm rotates the spline shaft with no jumps or discontinuities in motion.

The testing carriage is retracted against the action of spring 156 and held retracted by the pin 180 for placement of successive spline shafts in position for checking. The rack and pinion mounting of the spline shaft headstock and tailstock centers affords ready placement of the spline shaft between the centers and also allows vertical adjustment of the spline shaft so that it may be checked at desired locations along its length.

Upon retraction of the pin 180 the spring 156 urges the carriage 84 forwardly to bring the enveloping worm 198 into mesh with the teeth of the spline shaft 196. The enveloping worm first is brought into contact with a spline of known dimensions and configuration and the knurled adjustment 172 on the plunger 170 of the gage or indicating instrument 162 is twisted to cause the dial pointer 164 to register on zero. Thereafter when the enveloping worm meshes with the teeth of a spline shaft to be checked and the worm is rotated by means of the wheel or knob 132 variations in size of the spline shaft, or in the shape or spacing of adjacent teeth of the spline shaft, or in runout or eccentricity or concentricity will force the enveloping worm 194 and testing carriage 84 back against the action of spring 156 or will allow them to move forward under the action of spring 156. This, in turn, forces the plunger 170 into the gage 162 or allows it to move farther out of the gage to cause the pointer 164 to shift along the dial. The dial is suitably calibrated so that the operator conducting the check will know when the spline shaft exceeds the permissible variations and must be rejected. If desired, a recording instrument may be operated concurrently with the gage or indicating instrument 162. Such recording instruments and their operation are well known and are not shown.

As noted heretofore, three factors, namely size, tooth shape and spacing, and runout are measured concurrently. It will be appreciated that errors in these three factors may tend to counteract one another and that by measuring the three factors concurrently a spline shaft which is satisfactory over-all will not be rejected as it might be if the factors were measured one by one.

The example herein shown and described is for illustrative purposes only and the right to make such changes

I claim:

1. An apparatus for testing splines comprising means including a pair of centers for mounting a spline for rotation about its axis, means including rack and pinion means for axially moving said centers, means for clamping on opposite sides of the rack to lock the same in adjusted position, testing means adapted to be in driving engagement concurrently with a plurality of the teeth of said spline, means for mounting said testing means for movement toward and away from said centers, means for maintaining said testing means and said spline in contact with one another, an indicating device responsive to movement of said testing device toward and away from said spline mounting centers, and means for operating said testing means to engage and test successive teeth of said spline.

2. Apparatus as set forth in claim 1 wherein the means for clamping on opposite sides of the rack comprises a nut, a sleeve, an elongated member extending through said sleeve and threaded into said nut, means on said elongated member limiting movement of said sleeve relative to said elongated member in a direction away from said nut, and means for rotating said elongated member relative to said nut.

3. Apparatus for testing toothed splines comprising a base, a vertically disposed center at the bottom of said base, a pair of spaced apart columns upstanding on said base and parallel to one another, a rack on each of said columns, a fixture mounted on both of said columns and vertically adjustable thereon, a center carried by said fixture in alignment with the first mentioned center and opposed thereto, rotary means carried by said fixture and extending transversely across both of said columns, said rotary means including pinion means meshing with both of said racks for vertically adjusting said fixture free from tilting, means for rotating said rotary means for effecting such vertical adjustment, a spline to be tested being carried by the said centers, testing means adapted to be in driving engagement simultaneously with a plurality of the teeth of said spline, means for mounting said testing means on said base for movement toward and away from said spline, indicating means responsive to movements of said testing means toward and away from said spline, and means for operating said testing means successively to test the teeth of said spline.

References Cited in the file of this patent

UNITED STATES PATENTS

| | | |
|---|---|---|
| 1,222,392 | Green | Apr. 10, 1917 |
| 2,057,970 | Pelphrey | Oct. 20, 1936 |
| 2,348,712 | Dahlerup | May 16, 1944 |
| 2,369,477 | Martin | Feb. 13, 1945 |
| 2,447,445 | Widen | Aug. 17, 1948 |

FOREIGN PATENTS

| | | |
|---|---|---|
| 13,465 | Great Britain | 1911 |
| 460,008 | Great Britain | Jan. 19, 1937 |

OTHER REFERENCES

American Machinist, Feb. 18, 1943, pgs. 97 and 98, Buckingham, of record, pages 289–292.